US009811814B2

(12) United States Patent
Phillips et al.

(10) Patent No.: US 9,811,814 B2
(45) Date of Patent: Nov. 7, 2017

(54) CHEMICALLY HEATED HOT EMITTER GENERATOR SYSTEM

(71) Applicant: GREEN LIGHT INDUSTRIES, INC., Chicago, IL (US)

(72) Inventors: Thomas J. Phillips, Chapel Hill, NC (US); Joseph M. Zlotnicki, Downers Grove, IL (US)

(73) Assignee: GREENLIGHT INDUSTRIES, INC., West Chicago, IL (US)

( * ) Notice: Subject to any disclaimer, the term of this patent is extended or adjusted under 35 U.S.C. 154(b) by 0 days.

(21) Appl. No.: 14/777,147

(22) PCT Filed: Aug. 27, 2013

(86) PCT No.: PCT/IB2013/001936
§ 371 (c)(1),
(2) Date: Sep. 15, 2015

(87) PCT Pub. No.: WO2014/140681
PCT Pub. Date: Sep. 18, 2014

(65) Prior Publication Data
US 2016/0042332 A1    Feb. 11, 2016

(51) Int. Cl.
| H01H 50/12 | (2006.01) |
| G06Q 20/14 | (2012.01) |
| G06Q 30/06 | (2012.01) |
| G06Q 50/06 | (2012.01) |
| F23N 1/02 | (2006.01) |
| F23N 5/00 | (2006.01) |
| F23N 5/24 | (2006.01) |
| F23C 7/06 | (2006.01) |
| F23D 14/16 | (2006.01) |

(Continued)

(52) U.S. Cl.
CPC ............... *G06Q 20/14* (2013.01); *F23C 7/06* (2013.01); *F23D 14/16* (2013.01); *F23D 14/18* (2013.01); *F23N 1/022* (2013.01); *F23N 5/003* (2013.01); *F23N 5/242* (2013.01); *G06Q 30/0645* (2013.01); *G06Q 50/06* (2013.01); *F23C 2202/30* (2013.01); *F23J 2219/10* (2013.01); *H02J 3/383* (2013.01); *Y02E 10/563* (2013.01); *Y04S 50/10* (2013.01)

(58) Field of Classification Search
CPC ........ F01D 17/02; F24H 1/0045; G06Q 20/04
USPC .......................................... 395/240; 361/139
See application file for complete search history.

(56) References Cited

U.S. PATENT DOCUMENTS 5,699,528 A * 12/1997 Hogan ................... G06Q 20/04
705/40
6,363,330 B1 * 3/2002 Alag ...................... G01K 7/026
236/15 BB (Continued)

FOREIGN PATENT DOCUMENTS

WO    WO2014140681 A1    9/2014

OTHER PUBLICATIONS

International Preliminary Examining Authority. PCT International Preliminary Report on Patentability for International Application No. PCT/IB13/01936, dated Jun. 6, 2016. pp. 1-41.

*Primary Examiner* — Rokib Masud
(74) *Attorney, Agent, or Firm* — Peter K. Trzyna, Esq.

(57) ABSTRACT

The technical field includes machine, manufacture, process, and product produced thereby, as well as necessary intermediates, which pertain to power sources, units thereof, computer systems used to facilitate operation of one or more power sources.

17 Claims, 11 Drawing Sheets

Generator Management

(51) Int. Cl.
*F23D 14/18* (2006.01)
*H02J 3/38* (2006.01)

(56) References Cited

U.S. PATENT DOCUMENTS

| | | | | |
|---|---|---|---|---|
| 7,138,093 B2* | 11/2006 | McKay | ................. | F24H 1/0045 |
| | | | | 165/148 |
| 7,369,057 B2* | 5/2008 | Twerdochlib | ........... | F01D 17/02 |
| | | | | 250/370.01 |
| 2008/0109385 A1 | 5/2008 | Baker | | |
| 2010/0185336 A1* | 7/2010 | Rovnyak | ................... | H02J 3/38 |
| | | | | 700/287 |
| 2011/0161250 A1* | 6/2011 | Koeppel | ................. | G06Q 10/04 |
| | | | | 705/412 |
| 2011/0284059 A1 | 11/2011 | Celanovic et al. | | |

* cited by examiner

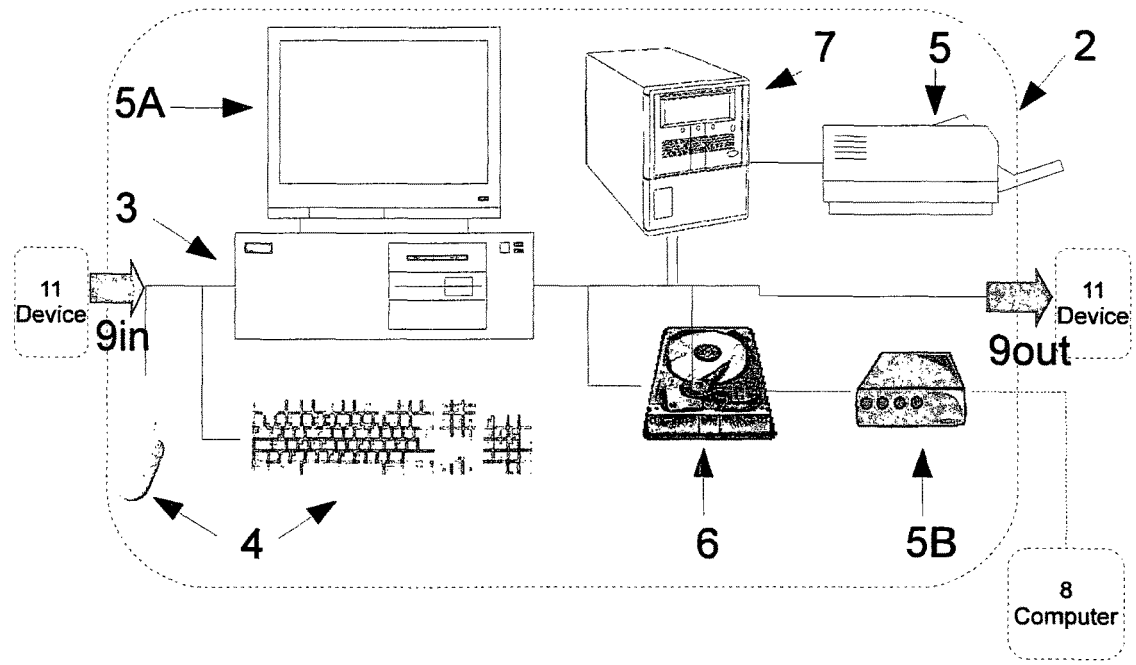
FIG. 1 Computer System

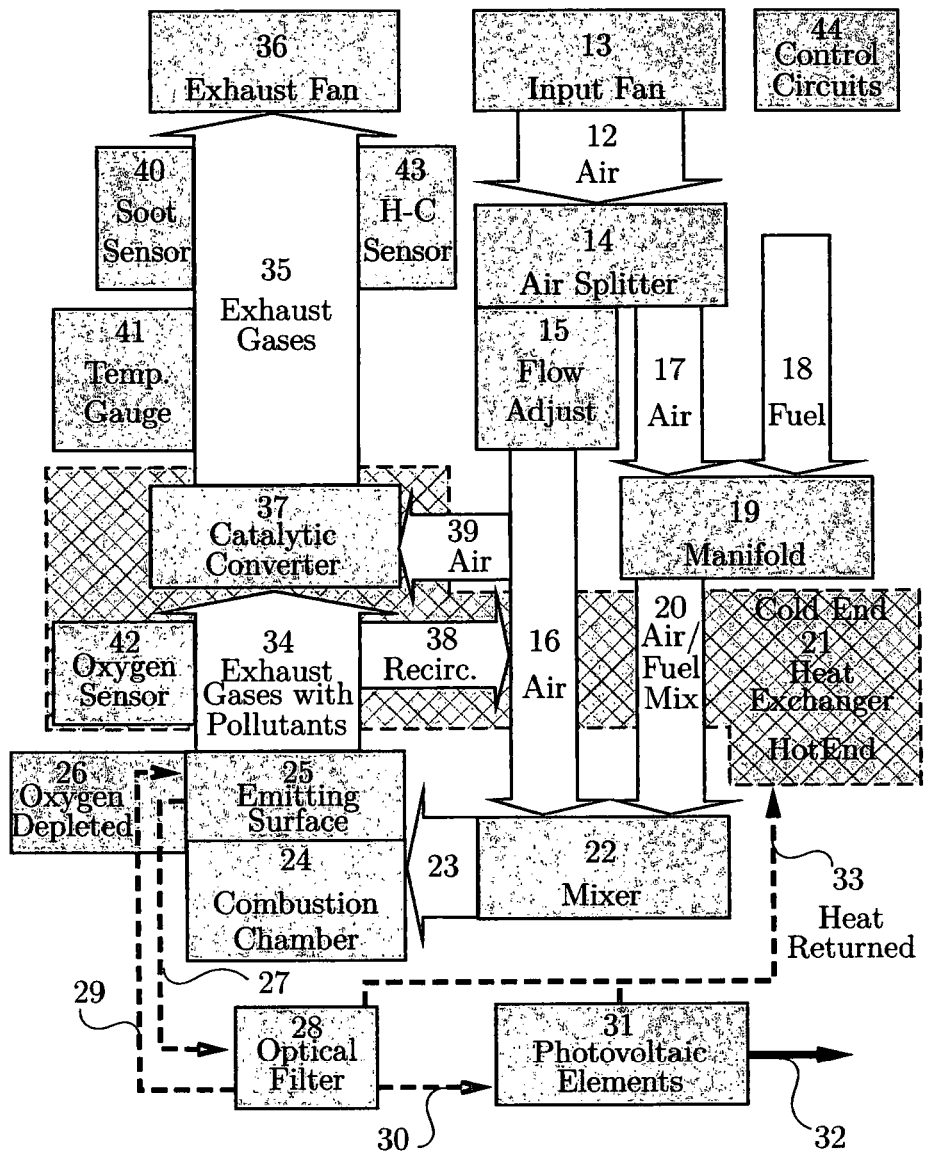
FIG. 2 Chemically Heated Hot Emitter Generator

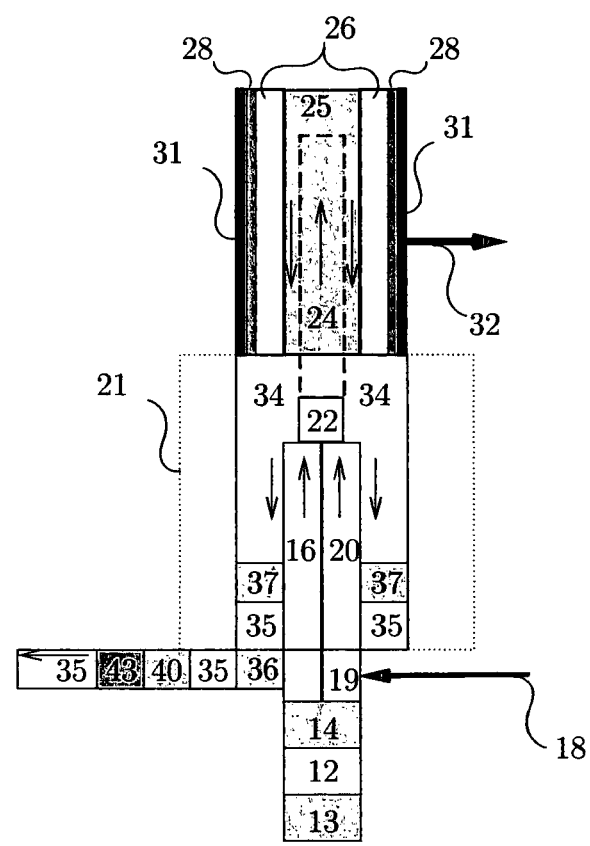
FIG. 3 Chemically Heated Hot Emitter Generator

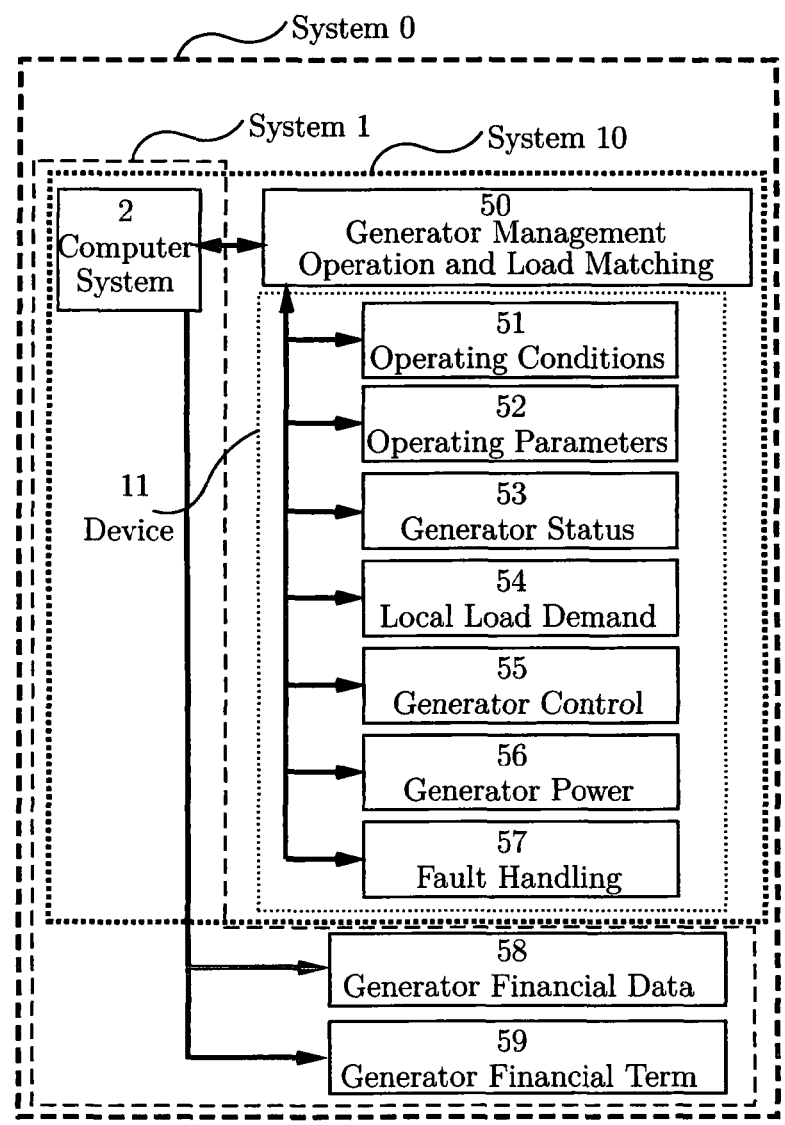
FIG. 4 Generator Management

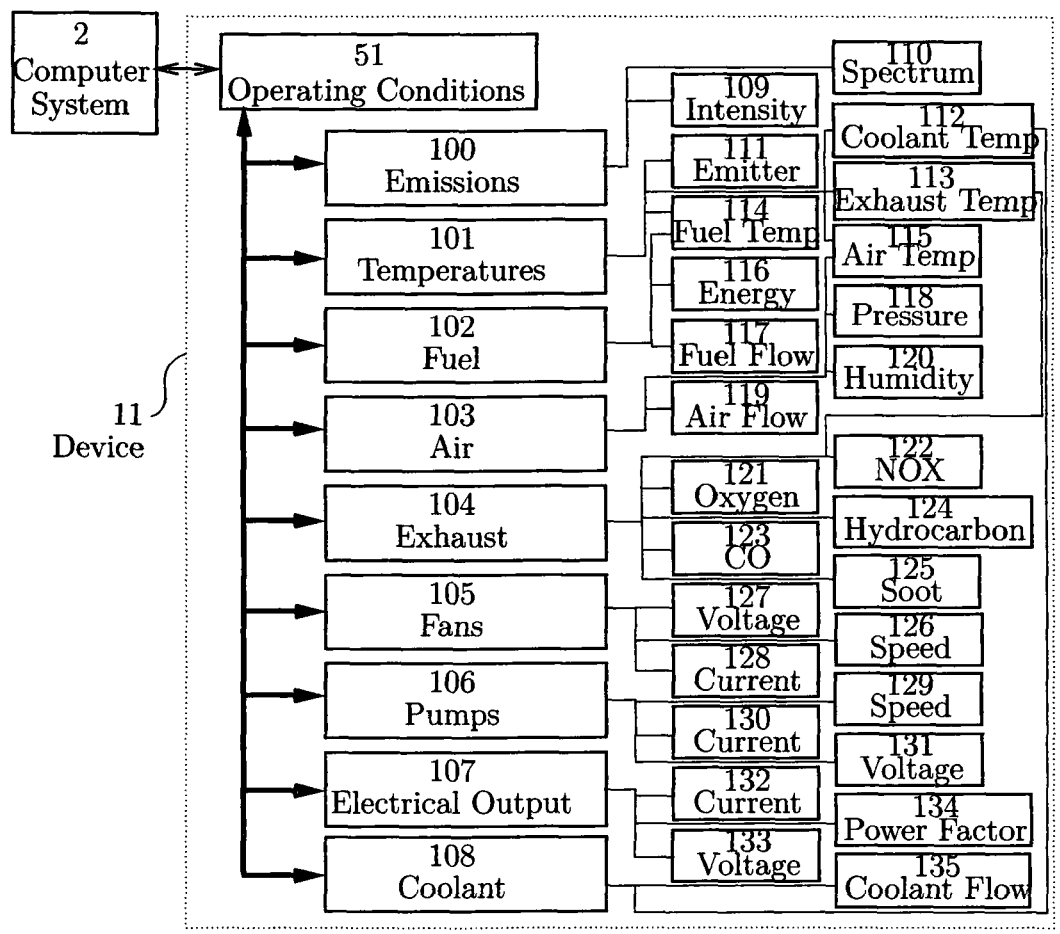
FIG. 5 Operating Conditions

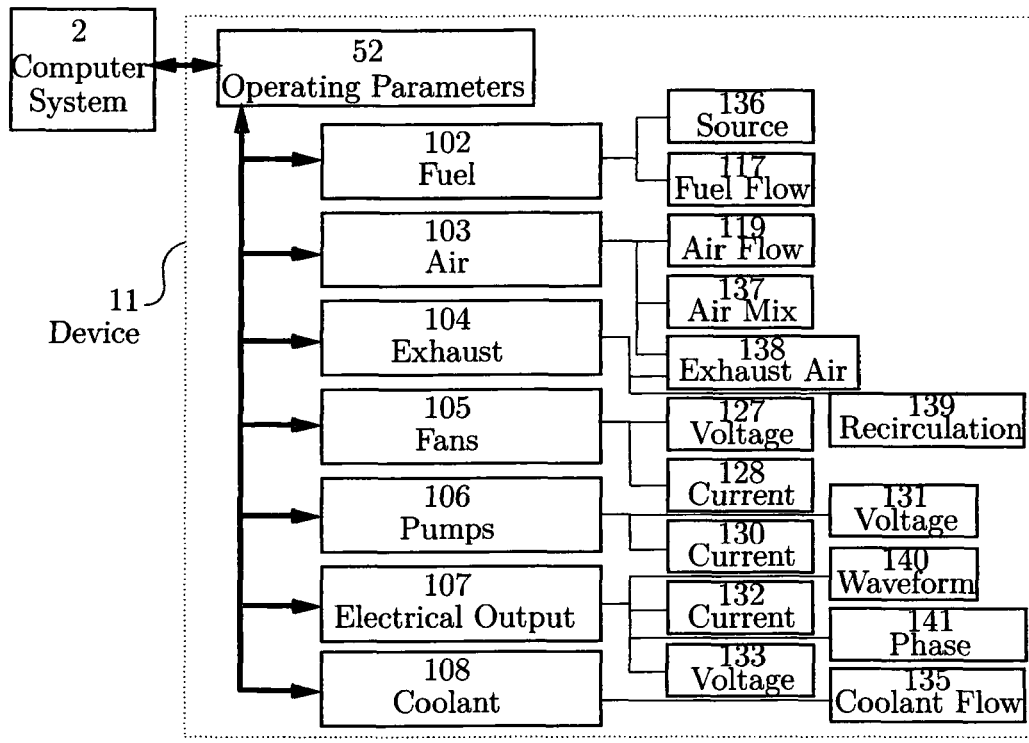
FIG. 6 Operating Parameters
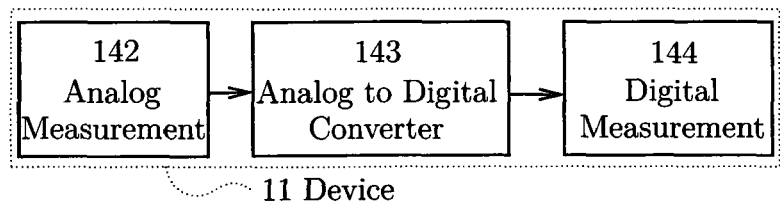
FIG. 7 Analog to Digital Conversion

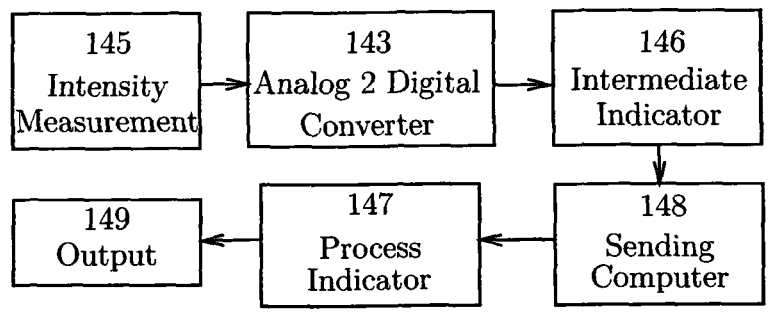
FIG. 8 Intensity Measurement
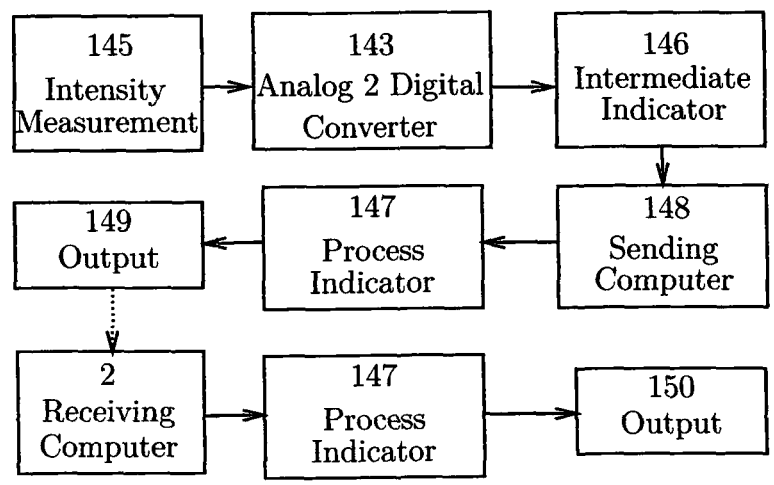
FIG. 9 Sending and Receiving System
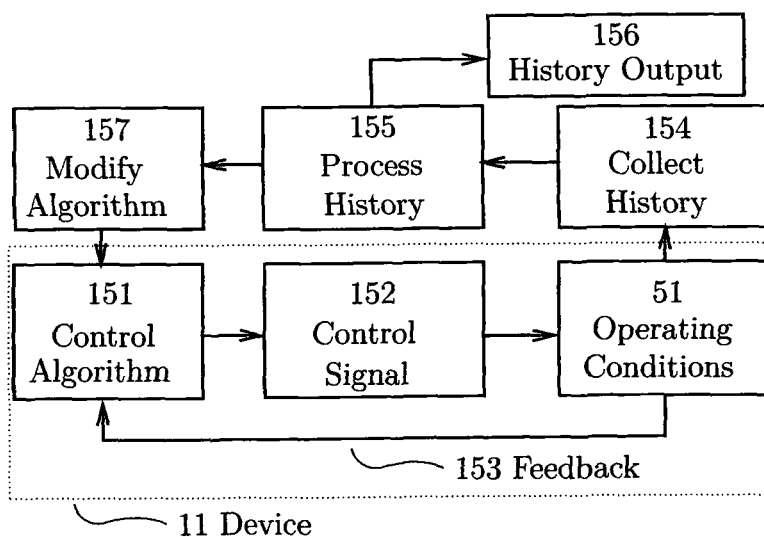
FIG. 10 Device Control

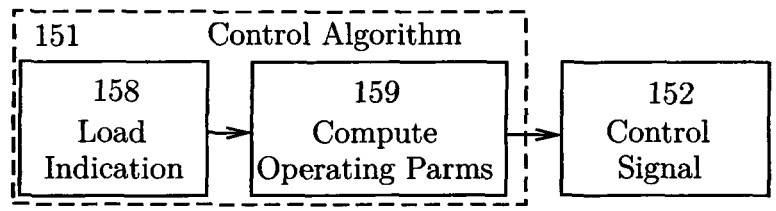
FIG. 11 Control for Load
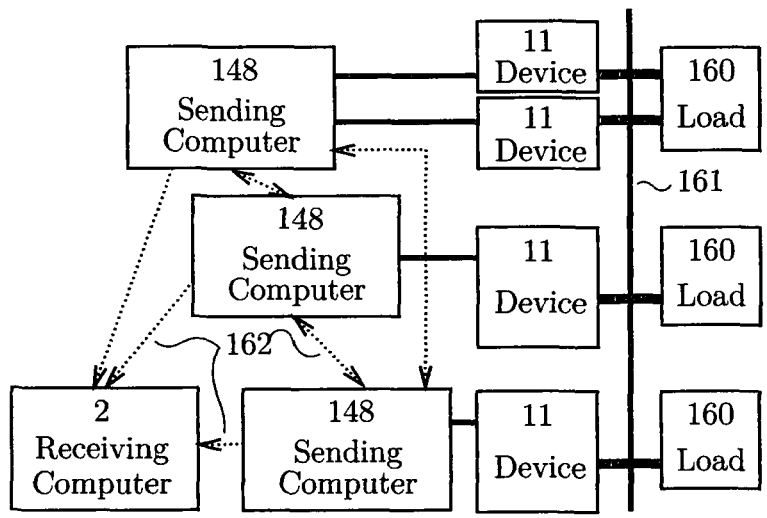
FIG. 12 Plurality of Cooperating Devices

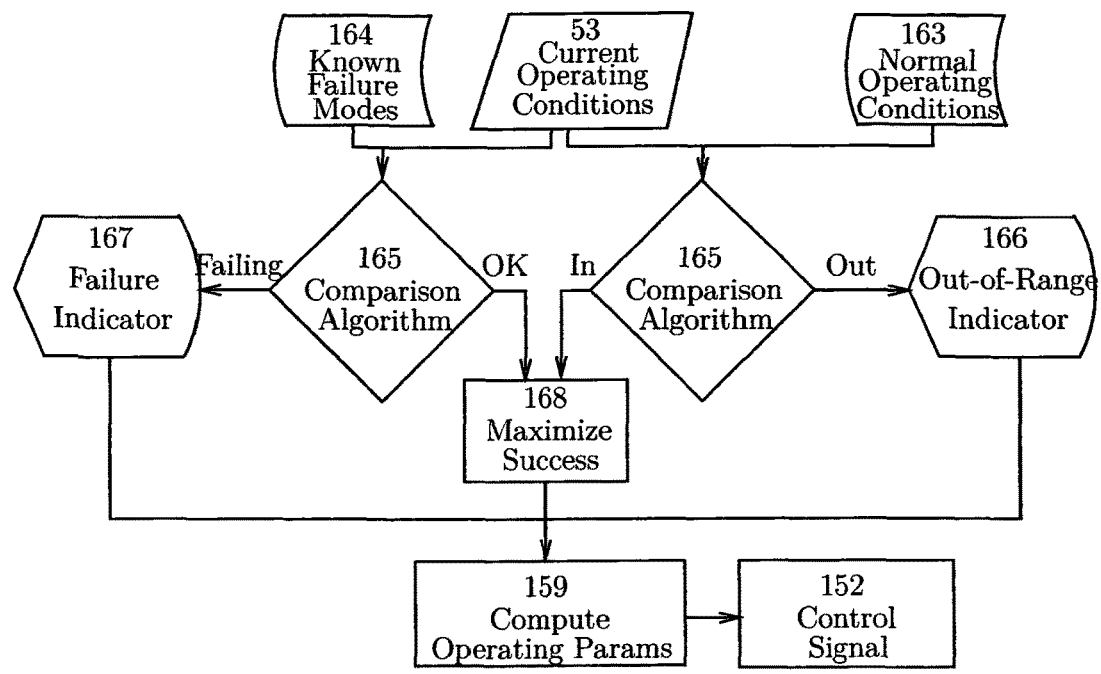
FIG. 13 Comparison Algorithm

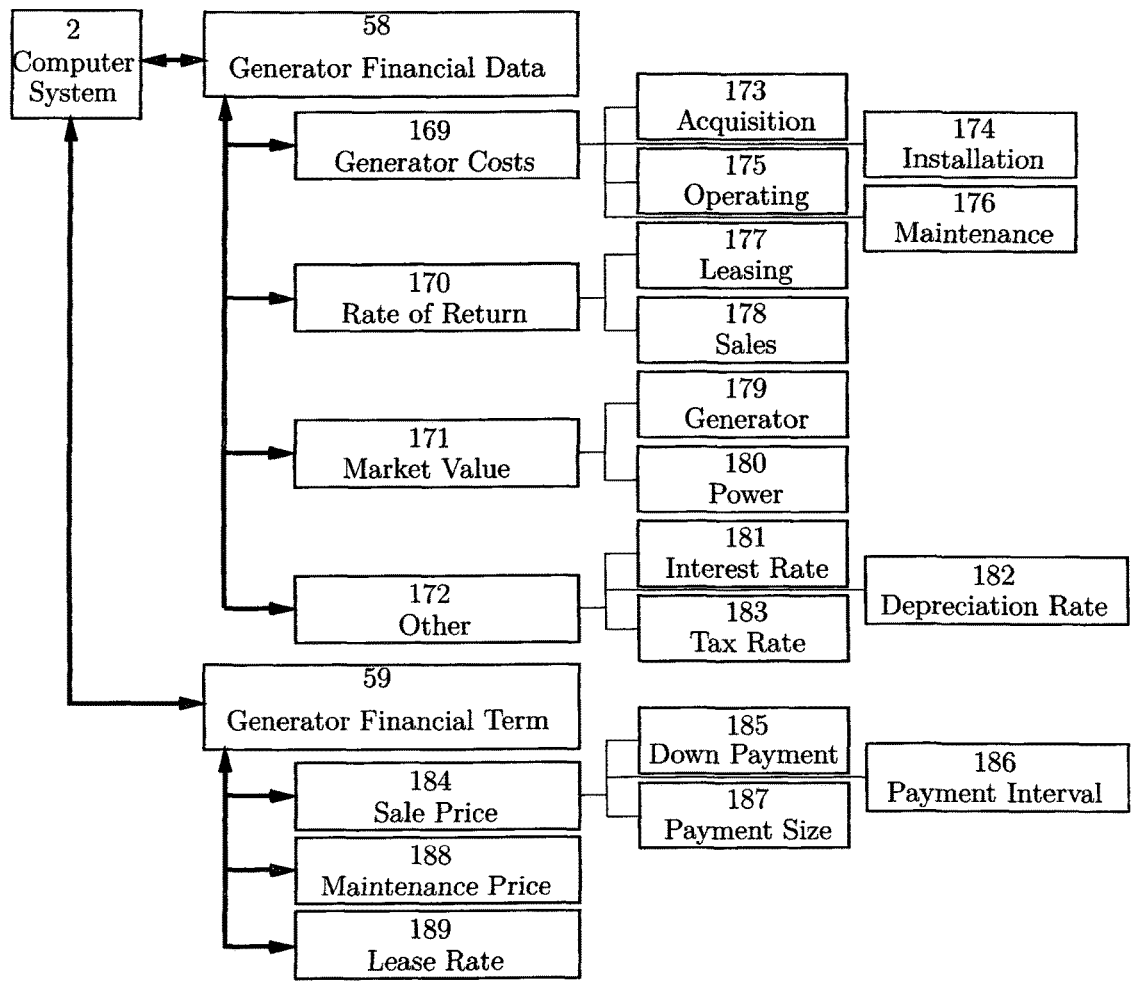
FIG. 14 Financial Data and Terms

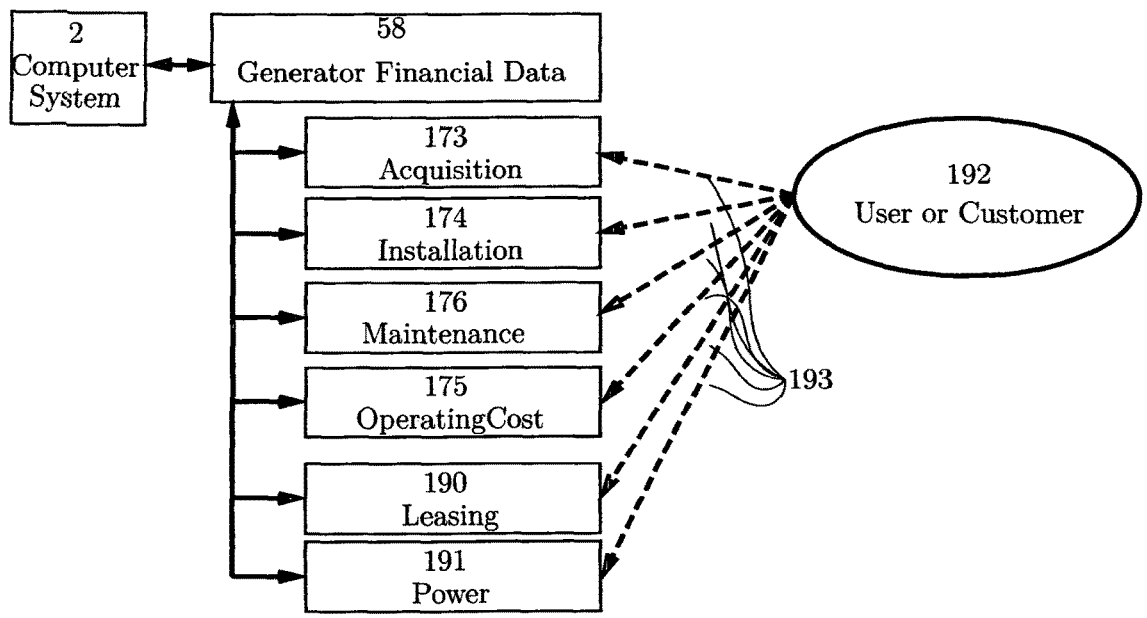
FIG. 15 Financial Data Flow

US 9,811,814 B2

CHEMICALLY HEATED HOT EMITTER GENERATOR SYSTEM

TECHNICAL FIELD

The technical field includes machine, manufacture, process, and product produced thereby, as well as necessary intermediates, which pertain to power sources, units thereof, computer systems used to facilitate operation of one or more power sources.

BRIEF DESCRIPTION OF THE DRAWINGS

For a more complete understanding, reference is made to the following description and accompanying drawings, in which:

FIG. 1 is an illustration of an embodiment of a computer system;

FIG. 2 is an illustration of an embodiment of a chemically heated hot emitter generator of electromagnetic emissions;

FIG. 3 is an illustration of an embodiment of a chemically heated hot emitter generator of electromagnetic emissions;

FIG. 4 is an illustration of an embodiment of generator management;

FIG. 5 is an illustration of an embodiment showing some possible operating conditions;

FIG. 6 is an illustration of an embodiment showing some possible operating parameters;

FIG. 7 is an illustration of an embodiment showing conversion of an analog measurement to a digital measurement;

FIG. 8 is an illustration of an embodiment showing conversion of an analog intensity measurement;

FIG. 9 is an illustration of an embodiment showing conversion and processing of an analog intensity measurement;

FIG. 10 is an illustration of an embodiment showing execution of a control signal to adjust operating conditions, with optional feedback, history collection and processing;

FIG. 11 is an illustration of an embodiment showing production of a control signal from a load indication;

FIG. 12 is an illustration of an embodiment showing a plurality of cooperating devices;

FIG. 13 is an illustration of an embodiment showing comparison algorithms being used to set warning indicators;

FIG. 14 is an illustration of an embodiment showing examples of financial data and financial terms; and FIG. 15 is an illustration of an embodiment showing examples of financial payments.

MODES

A chemically heated hot emitter generator is a generator of electricity. The generator is comprised of a hot or heated emitter (heated by a flame and/or other exothemic chemical reaction) and one or more photovoltaic cells that convert emitted electromagnetic radiation into electric power, non-limiting examples are disclosed in U.S. patent applications 60/833,335; 60/900,866; application Ser. Nos. 11/828,311; 12/375,176; and 13/595,062 as well as PCT application PCT/US2007/074446; all of which are incorporated by reference as if fully restated herein.

Chemically heated hot emitter generators enable distributed electric power generation, e.g. where generators are located at individual buildings, groups of buildings, and/or neighborhoods instead of centralized at a power plant. The distributed structures disclosed herein eliminate losses due to the transmission of the electric power from the centralized power plant to the individual buildings, groups of buildings, or neighborhoods, and can, depending upon the embodiment, be more efficient and more robust than generating power at a centralized power plant. Also, if the local generation capacity is sufficient to meet all the local power needs, this distributed structure reduces or eliminates the potential for large-area blackouts due to the centralized power plant going offline or the loss of the transmission lines between the centralized power plant and the individual buildings, groups of buildings, or neighborhoods.

Producing electric power using a plurality of chemically heated hot emitter generators located close to their electric power consumer(s) and/or customer(s) has a number of functions that are unique in connection with forming a new industry, compared to conventional electric power generation, and such functions can be addressed by embodiments discussed hereafter.

FIG. 1 illustrates a computer system [2], such as an IBM™, Hewlett Packard™, or other computer with input and output devices, but a system can have any or all of the components depending on the embodiment at issue. Computer [2] can have one or more Processors [3] (e.g., an Intel™ or AMD™ series processor or the like), a memory [6] (e.g., a hard drive, disk drive, ROM, etc.), computer readable medium [7], input devices [4] (e.g., keyboard, mouse, modem [5B], or the like), and one or more output devices [5] (e.g., a Hewlett Packard™ printer [5], a Dell™ monitor [5A], a modem [5B], or other such output device). Note that the modem [5B] is representative of a computer-to-computer communication device that can operate as an IO [9] (input-output) device. In some embodiments the computer system [2] can be comprised of an embedded processor [3] such as a Cypress PSoC 5™. In other embodiments the computer system [2] can be comprised of a field-programmable gate array (FPGA) or other hardware where algorithm logic is hard-wired rather than stored in memory.

Depending on the embodiment desired, the computer system [2] can communicate with one or more other computers, illustrated in FIG. 1 as a box, but understood to comprise one or more computers which can be communicatively associated or linked, e.g. as networked computer [8], which can, but need not, be an equivalent computer or computer system with respect to computer or computer system [2].

The computer system [2] can, also depending on the embodiment preferred for a given application, be in communication with equipment, or device [11], which is shown illustratively as a box device [11] in FIG. 1 so as to indicate that equipment or device [11] can be one or more devices [11]. For example, device [11] can comprise one or more chemically heated hot emitter generators. This communication can include input [9A] from the device [11] and output [9B] to the device [11].

FIG. 2 and FIG. 3 show an example of a chemically heated hot emitter generator of electromagnetic emissions that may be used in embodiments of a device [11]. The chemical heating is from an exothermic chemical reaction which, depending upon the embodiment, could involve a flame, a plasma, etc. In this embodiment, input air [12] is pushed into an air splitter [14] by an input fan [13] (by fan we mean fan, blower, pump, or other means for moving material) where it is split by an air splitter [14] into air without fuel [16] and air with fuel [17], with the proportion of each determined by a flow adjuster [15]. Note that input air [12] is not restricted to atmospheric air; in some embodiments it is enriched in oxygen, it may be pure oxygen or some other mixture or chemical formulation, and in some embodiments the chemical reactant is not oxygen. In some embodiments, the input air [12] and/or the input fuel [18] are not gases. The air with fuel [17] is mixed with input fuel [18] in a manifold [19] to make an air/fuel mixture [20]. Both the air without fuel [16] and the air/fuel mixture [20] are heated in a heat exchanger [21] before they are mixed in a mixer [22]. This combustion input [23] enters a combustion chamber [24] wherein it reacts and heats the hot emitting surface [25]. This emitting surface [25] emits electromagnetic emissions [27], in some embodiments through an oxygen depleted region [26] which is comprised of a vacuum, air/fuel mixture [20], exhaust gases [35], or some other oxygen depleted gas, depending upon the embodiment. In some embodiments the electromagnetic emissions [27] pass through an optical filter [28] which can, but need not, return some reflected emissions [29] to the emitting surface [25] and passing selected transmitted emissions [30] to the photovoltaic elements [31] which produce output power [32]. In some embodiments the optical filter [28] and/or the photovoltaic elements [31] are cooled and the heat can be, but need not be, returned to the input air [12], air without fuel [16], and/or the air/fuel mixture [20]. The exhaust gasses with pollutants [34] from the combustion chamber [24] and the emitting surface [25] may enter a catalytic converter [37] where some pollutants are removed. Heat is also removed by one or more heat exchangers [21] used to heat the air without fuel [16] and the air/fuel mixture [20]. In some embodiments, part of the exhaust gases [35] are recirculated exhaust gas [38] to the air without fuel [16], the air/fuel mixture [20], or both. In some embodiments, additional air [39] is supplied to the catalytic converter [37]. After the catalytic converter [37], the exhaust gases [35] are removed by an exhaust fan [36]. The combustion processes and operation of the device [11] may be monitored by one or more sensors (e.g. an oxygen sensor [42], a temperature gauge [41], a soot sensor [40], and/or a hydrocarbon sensor [43]) and is controlled using control circuits [44]. Some embodiments have additional sensors, including multiple sensors of the same type.

A heat exchanger [21] can be configured to employ the heat from the exhaust gases [35] to produce a temperature gradient that can be employed in heating an oxygen sensor [42]. Temperatures in the exhaust gases [35] of device [11] can be so high that in some embodiments, e.g., the oxygen sensor [42] is located adjacent to the hot end of a heat exchanger [21], the device [11] is entirely devoid of electrical powering of the oxygen sensor [42] that would otherwise be conventionally required to maintain the oxygen sensor [42] at operational temperatures. In other embodiments, the oxygen sensor [42] can be spaced in between the hot end and the cold end of a heat exchanger [21], where the temperature is less than the oxygen sensor's [42] operating temperature, but above the temperature of the exhaust, thereby influencing the power required for operation of the oxygen sensor [42] and thereby controlling and influencing the extent of power output by the device [11]. Therefore, embodiments of the invention may use an oxygen sensor [42] positioned such that it receives heat from the exhaust gases [35] to reach operational temperature. The oxygen sensor [42] may receive sufficient heat such that a reduced amount of external power is required to reach operational temperatures. In some embodiments the oxygen sensor [42] can be placed such that it reaches operational temperature without requiring external power to be supplied.

FIG. 4 shows an embodiment of a device [11] managed by a computer system [2]. The computer system [2] can communicate with one or more devices [11] which may, but need not in all cases depending upon the embodiment, be the one or more chemically heated hot emitter generators such as the example shown in FIG. 2 and FIG. 3. These devices [11] can report their operating conditions [51] and generator status [53] which may, but need not, include fault handling [57]. The computer system [2] can send generator control [55] signals to change operating parameters [52] which may, but need not, include fault handling [57] responses and adjustments to match the generator power delivered [56] to the local load demand [54]. Note that in some embodiments the computer system [2] may be comprised of a micro controller located in or adjacent to the chemically heated hot emitter generator to carry out some or all of these functions.

FIG. 4, and that identified therein, illustrates a system [0], which comprises a means for receiving digital data representing a chemically heated hot emitter generator of electromagnetic emissions, and processing the digital data representing the chemically heated hot emitter generator of electromagnetic emissions. The thin dashed lines in FIG. 4 encompassing financial system [1] and the thick dotted lines encompassing control system [10] illustrate that in some, but not all, embodiments there can be a "means for" that includes generator financial data [58] and/or generator financial term [59], and computer system [2]; or a "means for" that includes generator status [50] and Load Matching, and any or all of items [51]-[59] and computer system [2]; and system [0] comprises both.

In the embodiments of FIG. 4, with respect to this "means for" illustrating computer system [2] may, or may not, depending on the particular configuration desired, comprise the same computer or a separate computer.

FIG. 5 shows an embodiment with more details about operating conditions [51] of a chemically heated hot emitter generator. As non-limiting examples, the computer system [2] can receive measurements relating to one or more of electromagnetic emissions [100], temperatures [101], fuel [102], air [103], exhaust [104], fans [105], pumps [106], coolant [108], and electrical output [107].

Some examples of operating conditions [51] related to electromagnetic emissions [100] include intensity [109] and spectrum [110]. Both the intensity [109] and the spectrum [110] are related to the emitter temperature [111]. Depending upon the emitter material, the spectrum [110] can be close to a black body spectrum, or emission at some wavelengths could be suppressed while other wavelengths can be enhanced. The shape of the spectrum [110] can change in time as the composition of the emitter changes, as may occur as the emitter deteriorates. Therefore monitoring of the spectrum [110] in some embodiments is a diagnostic tool capable of indicating when maintenance is required, for example by replacing the emitter. Similarly, the intensity [109] of the electromagnetic emissions is a strong function of emitter temperature [111]. In some embodiments, the intensity [109] is monitored through a window or filter that can deteriorate, and a reduced intensity [109] for a given emitter temperature [111] is an indication that maintenance is required.

Some examples of temperatures [101] include emitter temperature [111], exhaust temperature [113], input fuel temperature [114], and input air temperature [115], and coolant temperature [112]. For a properly operating device [11], there is a clear correlation between some of these temperatures [101]. For example, in some embodiments the difference between input air temperature [115] and exhaust temperature [113] is an indication of whether the device [11] is in the process of warming up or is in equilibrium. This information can be used, depending upon the embodiment, by the control algorithm [151] to adjust the input air flow [119] and input fuel flow [117], for example, for optimum operation. The emitter temperature [111] is related to the spectrum [110] and the intensity [109], and the intensity [109] is related to the maximum output current [132]. Therefore in some embodiments the control algorithm [151] will control signals [152] to change the emitter temperature [111] by changing, for example, a fan current [128] and a pump current [130] to change the input air temperature [115] and the input fuel flow [117], in order to match the generator power delivered [56] to the load [160].

Some examples of fuel [102] operating conditions [51], one or more of which may, but need not, be used in an embodiment, include input fuel flow [117], fuel energy content [116], and input fuel temperature [114]. Some embodiments can use multiple fuels or change from one fuel to another (e.g. natural gas for hydrogen), and some embodiments use fuels with varying composition, so in some embodiments an important operating condition [51] is the fuel energy content [116]. The control algorithm [151] in some embodiments adjusts the input fuel flow [117] based upon the fuel energy content [116] measurement to maintain the desired emitter temperature [111].

Some examples of air [103] operating conditions [51], one or more of which may, but need not, be used in an embodiment, include input air flow [119], input air temperature [115], input air pressure [118], and input air humidity [120]. In some embodiments the control algorithm [151] adjusts the input air flow [119] based upon the input air temperature [115] and input air pressure [118] in order to make a desired match (e.g. stochiometric, rich, or lean) with the fuel based upon the input fuel flow [117] and the input fuel temperature [114].

Some examples of exhaust [104] operating conditions [51], one or more of which may, but need not, be used in an embodiment, include exhaust temperature [113], exhaust oxygen content [121], exhaust NOX content [122], exhaust CO content [123], exhaust hydrocarbon content [124], and exhaust soot content [125]. Monitoring the exhaust [104] operating conditions [51] allows the control algorithm [151] to use feedback [153] to adjust the input air flow [119] and input fuel flow [117] to maintain the desired stochiometric mixture. If the mixture is lean, the exhaust oxygen content [121] may be high. If the mixture is rich, exhaust CO content [123] and/or exhaust hydrocarbon content [124] may be high. Detection of excess levels of exhaust NOX content [122] or exhaust soot content [125] could be an indication of a fault condition or in some embodiments an indication that an adjustment is needed in the exhaust recirculation of air injection before the catalytic converter. Some embodiments measure exhaust temperature [113], exhaust oxygen content [121], exhaust NOX content [122], exhaust CO content [123], exhaust hydrocarbon content [124], and/or exhaust soot content [125] both before and after a catalytic converter. In some embodiments the control algorithm [151] uses these measurements in a feedback [153] loop to control the operation of the catalytic converter.

Some examples of fans [105] operating conditions [51], one or more of which may, but need not, be used in an embodiment, include fan speed [126], fan current [128], and fan voltage [127]. Some embodiments have multiple fans that are adjusted independently by the control algorithm [151]. For example, some embodiments have multiple fans on the input in order to adjust the fuel-to-air ratio in different parts of the device [11]. Some embodiments have fans on both the input and on the exhaust. Some embodiments have fans for exhaust recirculation. Some embodiments have fans for injecting air before the catalytic converter. Some embodiments have fans to move a gaseous coolant, which can be but need not be air. Deviations of the correlations between fan speed [126], fan current [128], fan voltage [127], and input air flow [119] or coolant flow [135] from normal operating conditions [163] in some embodiments is an indication of a fault condition.

Some examples of pumps [106] operating conditions [51], one or more of which may, but need not, be used in an embodiment, include pump speed [129], pump current [130], and pump voltage [131]. Some embodiments have multiple pumps that are adjusted independently by the control algorithm [151]. In some embodiments, pumps are used to supply liquid fuel. In some embodiments, pumps are used to move liquid coolant. Deviations of the correlations between pump speed [129], pump current [130], pump voltage [131]. and input fuel flow [117] or coolant flow [135] from normal operating conditions [163] in some embodiments is an indication of a fault condition.

Some examples of coolant [108] operating conditions [51], one or more of which may, but need not, be used in an embodiment, include coolant flow [135] and coolant temperature [112]. The control algorithm [151] in some embodiments detects fault conditions if the coolant flow [135] is too low or if the coolant temperature [112] is either too high or too low, or if the rate of change of coolant temperature is too fast or too slow.

Some examples of electrical output [107] operating conditions [51] include output voltage [133], output current [132], and, for embodiments where the output is not direct current, output power factor [134], which can account, for example, for a phase difference between the voltage and the current for AC output.

Note that some operating conditions [51] fall into multiple categories, for example the input air temperature [115] falls into the categories of temperatures [101] and air [103]. Also, some operating conditions [51] do not fit into any of the existing categories. Both the listed categories [100]-[108] and the listed operating conditions [51] are intended to teach examples and are not intended to be complete lists.

Related to the operating conditions [51] are the operating parameters [52] used for generator control [55]. An embodiment of some operating parameters [52] are shown in FIG. 6. Many of the categories of operating parameters [52] correspond to categories of operating conditions [51]: fuel [102], air [103], exhaust [104], fans [105], pumps [106], coolant [108], and electrical output [107]. These operating parameters [52] are controlled by the computer system [2] producing control signals [152] comprised of instructions that, when executed, result in changes to one or more operating parameters [52]. In some embodiments the control signal [152] is comprised of a change in a digital value sent to a digital-to-analog converter (DAC), changing a control voltage or current. In some embodiments the control signal [152] results in a valve opening or closing. Such an embodiment controls the fuel source [136], which in some embodiments is a different fuel with a different fuel energy content [116]. The valve in some embodiments is digital (open or closed), and in other embodiments the valve is analog, so for example the input fuel flow [117] can be adjusted by the control algorithm [151].

Some examples of air [103] and exhaust [104] operating parameters [52] include input air flow [119], air mixture [137], exhaust air [138], and recirculation [139]. The total input air flow [119] is adjusted along with the input fuel flow [117] to change the emitter temperature [111] and to maintain the desired stochiometric mixture, which in some embodiments is monitored by the exhaust oxygen content [121], exhaust CO content [123], and/or exhaust hydrocarbon content [124]. The air can be mixed with the fuel at different places in the device [11], and the ratio of air mixed at different locations, the air mixture [137], is adjusted in some embodiments. Similarly, some air is mixed with the exhaust in some embodiments with catalytic converters, and the amount of this exhaust air [138] is adjustable in some embodiments. Similarly, some embodiments have recirculation [139] which is adjustable. Some embodiments use feedback [153] on the exhaust oxygen content [121], exhaust CO content [123], and/or exhaust hydrocarbon content [124], measured before and/or after the catalytic converter, in making these adjustments.

Some examples of fans [105] and pumps [106] operating parameters [52] include the fan voltage [127], the fan current [128], the pump voltage [131], and the pump current [130]. In some embodiments, input air flow [119], for example, is controlled by changing a fan voltage [127]. In some embodiments, input air flow [119], for example, is controlled by changing a fan current [128]. In some embodiments, input fuel flow [117], for example, is controlled by changing a pump voltage [131]. In some embodiments, input fuel flow [117], for example, is controlled by changing a pump current [130]. In some embodiments, coolant flow [135], for example, is controlled by changing a pump current [130], a pump voltage [131], a fan current [128], a fan voltage [127], or any combination of these.

Some example of electrical output [107] operating parameters [52] include the output current [132], the output voltage [133], the output phase [141], and the waveform [140]. In some embodiments where the electrical output [107] is either DC or AC, the output current [132] and/or the output voltage [133] are adjustable. In some embodiments where the electrical output [107] is AC, the output phase [141] and/or the waveform [140] are adjustable, for example to match the phase of the electrical grid [161]. The waveform [140] is comprised of frequency and shape, either or both of which are adjustable in some embodiments.

FIG. 7 shows an embodiment of an analog measurement [142] converted by an analog to digital converter [143] to a digital measurement [144]. An example, shown in FIG. 8, is a measurement of the intensity [109] of electromagnetic emissions [100] (intensity measurement [145]) from a chemically heated hot emitter, which would typically be an analog current measurement from a photocell. This analog measurement [142] would typically be converted to a digital measurement [144] by an analog to digital converter [143], the digital measurement [144] being an intermediate indicator [146] representing, related to, or derived from the chemically heated hot emitter electromagnetic emissions. This intermediate indicator [146] representing the chemically heated hot emitter electromagnetic emissions would typically be used by the computer system [2] for generator control [55], for example to match generator power delivered [56] to local load demand [54], for billing purposes, etc. Another intermediate indicator [146] representing the chemically heated hot emitter electromagnetic emissions is the generator power, the product of the output voltage [133], the output current [132], and the output power factor [134], since this intermediate indicator [146] represents a lower limit on the quantity of chemically heated hot emitter electromagnetic emissions. When used for billing or other such purposes, the intermediate indicator [146] representing the chemically heated hot emitter electromagnetic emissions would typically be processed [147] by a sending computer [148], the result being output [149] on an output device [5]. Some embodiments will have this output [149] transmitted to a computer system [2], which would process the intermediate indicator [147] and produce another output [150], as shown in FIG. 9. Any method of transmission is possible, ranging from electronic network transmission if the sending computer [148] is a networked computer [8], to transmitted manually by reading the output [149] from the sending computer [148] and manually inputting it into the receiving computer system [2].

FIG. 10 shows an embodiment where a control algorithm [151] is used to produce a control signal [152] to change operating conditions [51]. An optional feedback [153] loop can be used by the control algorithm [151] to ensure that the changes in the operating conditions [51] produced by the control signal [152] are within tolerances by further adjusting the control signal [152] based upon the measured operating conditions [51]. Some embodiments collect operating conditions history [154]. The computer system [2] processes this history [155] in various ways, depending on the embodiment. For example, the operating conditions history [154] can be processed to produce output from history [156]. One embodiment of this output from history [156] is a billing record for a quantity of chemically heated hot emitter emissions. In this embodiment the output from history [156] is an embodiment of an output [149]. Another embodiment is to process this history [155] to modify the control algorithm [157]. This modified control algorithm would replace the control algorithm [151] so as to change the operating conditions [51]. This change could be a change in a single parameter in the control algorithm [151], or in another embodiment, there is a change in the control algorithm [151] structure.

FIG. 11 shows an embodiment in which the control algorithm [151] uses a load indication [158] to compute operating parameter(s) [159] and produce a control signal [152] to change the operating conditions [51] so as to meet at least some of the load demand. One embodiment of this for a chemically heated hot emitter generator is to use a measurement of the output voltage [133] as a load indication [158]: a drop in output voltage [133] is an indication of additional demand, so the control algorithm [151] would produce a control signal [152] to increase the hot emitter emissions until the output voltage [133] reached a level indicating that the demand was being met. Monitoring the output voltage [133] in this manner is an embodiment of a feedback [153] loop.

A distributed chemically heated hot emitter power generation system embodiment implemented to power buildings is disclosed in the embodiment shown in FIG. 12. Each chemically heated hot emitter generator device [11] does not need to be able to provide the peak power demand of the load [160] (building or neighborhood) where the device [11] is located. A plurality of chemically heated hot emitter generators [11] can operate as a unit, as disclosed in US patent application Ser. No. 13/595,062, which is incorporated by reference as if fully restated herein. Each sending computer [148] system can receive local load demand [54] information and send control signals [152] to generator control [55] (throttle) the local chemically heated hot emitter generator(s) [11]. When the capacity of this(these) local chemically heated hot emitter generator(s) [11] is(are) exceeded, the sending computer [148] can send communications [162] to neighboring sending computer [148] systems, which in turn can send control signals [152] to generator control [55] (throttle up) their respective additional chemically heated hot emitter generators on the same power network [161] to meet this peak load demand. With this embodiment there may be no need for a central power plant connected to the same power grid [161], though the grid can, if so desired, be interconnected as a backup.

FIG. 13 shows an embodiment of a comparison algorithm [165] run on a computer system [2] to determine whether the operating conditions [51] is within normal operating conditions [163] or if they indicate a known failure mode [164]. When the operating conditions [51] are not within normal operating conditions [163], an out-of-range indicator [166] is produced. Depending upon the embodiment, non-limiting examples of this out-of-range indicator(s) [166] include an indicator light, a communication [162], for example to a receiving computer system [2] to generate a maintenance request, etc. Similarly, if a known failure mode [164] is detected, a failure indicator [167] is generated. Depending upon the embodiment, non-limiting examples of this failure indicator [167] include an indicator light, a communication [162], for example to a receiving computer system [2] to generate a maintenance request, etc. An example of an embodiment of the comparison algorithm [165] is a neural net algorithm that uses correlations between various operating conditions [51] to flag specific known failure modes [164]. For example, under normal operating conditions [163], a given range of fan current [128] will correspond to a specific range of fan speed [126] and input air flow [119]. An input air flow [119] below this range would be an indication of a blockage. Likewise, a given input air flow [119] and input fuel flow [117] would correspond to a range of emitter temperature [111] under normal operating conditions [163], and a deviation would be an indication of a known failure mode [164]. In some embodiments the normal operating conditions [163] would be determined by the operating conditions history [154] of the same device [11], while in other embodiments the normal operating conditions [163] would be determined by the operating conditions history [154] of one or more similar devices [11]. Some fault conditions will be signaled by deviations of a single operating condition [51], while other fault conditions will be signaled by subtle correlations between different operating conditions [51]. The embodiment of the comparison algorithm [165] to create an out-of-range indicator [166] and/or a failure indicator [167] for the case where the fault is indicated by a single operating condition [51] can be a conditional statement, while the embodiment of the comparison algorithm [165] to create an out-of-range indicator [166] and/or a failure indicator [167] for the case where the fault is indicated by a subtle correlation between two or more operating conditions [51] can be a neural net or similar algorithm trained on operating conditions history [154] where the fault has previously occurred.

Depending upon the embodiment, when an out-of-range indicator [166] and/or a failure indicator [167] are produced, the control algorithm [151] may compute operating parameter(s) [159] and output a control signal [152] to adjust the operating conditions [51]. For example, the control algorithm [151] may try to bring the operating conditions [51] back into normal operating conditions [163]. For some known failure modes [164] the control algorithm [151] may turn off the device [11]. Under normal operating conditions [163], the control algorithm [151] may try to maximize success [168]. Non-limiting examples of success realms include maximizing efficiency, minimizing the need for maintenance, minimizing operating cost [175], minimizing deviations from nominal voltage, minimizing noise generation, minimizing response time for changing output power, minimizing grid [161] current in load-sharing situations, and maximizing fault tolerance.

FIG. 14 shows an embodiment of the means for receiving generator financial data [58] and processing these data to produce one or more financial terms generator financial term [59]. Exemplary data representing the chemically heated hot emitter generator of electromagnetic emissions can be a general product identifier, model number, code, or the like. The at least one other chemically heated hot emitter generator can be a particular one or ones of that product identifier, model number, code, or the like. For example, particular chemically heated hot emitter generators can be identified by a particular serial number or the like. In some, but not all embodiments, there can be a means configured to use the data representing the chemically heated hot emitter generator of electromagnetic emissions, related to an intermediate indicator of detected chemically heated hot emitter electromagnetic emissions, in producing output which is associated with at least one other chemically heated hot emitter generator of electromagnetic emissions having conformity with, but not operationally integrated in a unit comprising, said hot emitter generator of electromagnetic emissions, to operate said at least one other chemically heated hot emitter generator.

In some embodiments operating conditions history [154] is also processed to produce these generator financial terms [59]. In some embodiments some of the generator financial data [58] represent one or more chemically heated hot emitter generators, such as generator costs [169], examples of which include acquisition cost [173], installation cost [174], operating cost [175], and maintenance cost [176]. In some embodiments the generator financial data [58] is comprised of a rate of return [170], such as a leasing rate of return [177] and/or a sales rate of return [178]. In some embodiments the generator financial data [58] is comprised of a market value [171], such as a generator value [179] and/or a power value [180]. In some embodiments the generator financial data [58] is comprised of other financial data [172], such as an interest rate [181], a depreciation rate [182], and/or a tax rate [183].

In some embodiments the generator financial term [59] produced by processing these generator financial data [58] is comprised of a sale price [184]. In some embodiments the sale price [184] is comprised of a down payment [185], a payment interval [186], and/or a payment size [187]. In some embodiments the generator financial term [59] is comprised of a maintenance price [188]. In some embodiments the generator financial term [59] is comprised of a lease rate [189].

FIG. 15 shows an embodiment of some of the costs and payments [193] a user or customer [192] could make. The acquisition cost [173] is the cost to produce or purchase the device [11], depending upon the embodiment. The installation cost [174] is the cost to install the device [11], which, depending upon the embodiment, includes such costs as the cost to install electrical infrastructure, fuel infrastructure, architectural design, transportation, etc. The maintenance cost [176] is the cost to maintain the device [11], which, depending upon the embodiment, includes such costs as the cost to replace parts that wear out, the cost to clean or replace parts that get dirty or clogged such as filters, the cost of making repairs, etc. The operating cost [175] is the cost to operate the device [11], which, depending upon the embodiment, includes such costs as the cost of fuel, the cost of monitoring the device [11], the labor cost of operators, etc. It is possible for some costs, such as the cost of making adjustments to operating parameters, to be classified in multiple categories such as operating cost [175] and maintenance cost [176]. In some embodiments, there will be a leasing cost [190] paid with periodic payments [193] by the user or customer [192] to a leasing Company. In some embodiments, there will be a power cost [191], based upon power usage, paid with periodic payments [193] by the user or customer [192], to a leasing Company. In some embodiments (not shown), there will be a power cost [191], based upon power usage, paid with periodic payments [193] to the user or customer [192], to a Company, or both, for excess power supplied to the grid [161].

The operation of a device [11] requires that all of these costs are covered, either directly by the customer, or by a Company, depending upon the embodiment. Here the Company is one or more companies that sell, lease, install, operate, and/or maintain the device [11]. Depending upon the embodiment, the user or customer [192] performs some of the functions associated with these costs while one or more Companies perform the other functions, or in some embodiments one or more of the functions and the associated costs are split between the user or customer [192] and one or more Companies. Some embodiments showing how the costs could be split between the user or customer [192] and one or more Companies are shown in table 0.1 and table 0.2. In the embodiment numbered 1, the cost the user or customer [192] pays is for the power cost [191] for the power used. In the embodiment numbered 3, the cost the user or customer [192] pays is the leasing cost [190]. This embodiment might be used in a situation where the device [11] operates at or near full power all the time. In the embodiment numbered 39, the user or customer [192] pays for the device [11] and all other costs, so this corresponds to an outright sale where the user or customer [192] is responsible for all costs. Additional embodiments (not shown) have any or all of the costs shared between the user or customer [192] and one or more Companies. Additional embodiments (not shown) have one or more Companies and/or one or more additional power customers pay power cost [191] to the user or customer [192] for power generated by the device [11] and delivered, for example, by a grid [161].

In sum, with respect to the description herein, numerous specific details are

TABLE 0.1

| | | Embodiments | | | |
|---|---|---|---|---|---|
| Device [11] | Installation [174] | Operating [175] | Maintenance [176] | Power [191] | Lease [190] |
| 1 Company | Company | Company | Company | Customer | no |
| 2 Company | Company | Company | Company | Customer | yes |
| 3 Company | Company | Company | Company | | yes |
| 4 Company | Company | Company | Customer | Customer | no |
| 5 Company | Company | Company | Customer | Customer | yes |
| 6 Company | Company | Company | Customer | | yes |
| 7 Company | Company | Customer | Company | | yes |
| 8 Company | Company | Customer | Company | Customer | yes |
| 9 Company | Company | Customer | Company | Customer | no |
| 10 Company | Company | Customer | Customer | Customer | no |
| 11 Company | Company | Customer | Customer | Customer | yes |
| 12 Company | Company | Customer | Customer | | yes |
| 13 Company | Customer | Customer | Customer | | yes |
| 14 Company | Customer | Customer | Customer | Customer | yes |
| 15 Company | Customer | Customer | Customer | Customer | no |
| 16 Company | Customer | Customer | Company | Customer | no |
| 17 Company | Customer | Customer | Company | Customer | yes |
| 18 Company | Customer | Customer | Company | | yes |
| 19 Company | Customer | Company | Customer | | yes |
| 20 Company | Customer | Company | Customer | Customer | yes |

TABLE 0.1-continued

| | | Embodiments | | | |
|---|---|---|---|---|---|
| Device [11] | Installation [174] | Operating [175] | Maintenance [176] | Power [191] | Lease [190] |
| 21 Company | Customer | Company | Customer | Customer | no |
| 22 Company | Customer | Company | Company | Customer | no |
| 23 Company | Customer | Company | Company | Customer | yes |
| 24 Company | Customer | Company | Company | | yes | provided, such as examples of components and/or methods, to provide a thorough teaching and understanding of embodiments of the present invention. One skilled in the relevant art will recognize, however, that an embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Embodiments can be implemented in the form of control logic in software or

TABLE 0.2

| | | More embodiments. | | | |
|---|---|---|---|---|---|
| Device [11] | Installation [174] | Operating [175] | Maintenance [176] | Power [191] | Lease [190] |
| 25 Customer | Company | Company | Company | | yes |
| 26 Customer | Company | Company | Company | Customer | yes |
| 27 Customer | Company | Company | Company | Customer | no |
| 28 Customer | Company | Company | Customer | Customer | no |
| 29 Customer | Company | Company | Customer | Customer | yes |
| 30 Customer | Company | Company | Customer | | yes |
| 31 Customer | Company | Customer | Company | | yes |
| 32 Customer | Company | Customer | Company | Customer | yes |
| 33 Customer | Company | Customer | Company | Customer | no |
| 34 Customer | Company | Customer | Customer | Customer | no |
| 35 Customer | Company | Customer | Customer | Customer | yes |
| 36 Customer | Company | Customer | Customer | | yes |
| 37 Customer | Customer | Customer | Customer | | yes |
| 38 Customer | Customer | Customer | Customer | Customer | yes |
| 39 Customer | Customer | Customer | Customer | Customer | no |
| 40 Customer | Customer | Customer | Company | Customer | no |
| 41 Customer | Customer | Customer | Company | Customer | yes |
| 42 Customer | Customer | Customer | Company | | yes |
| 43 Customer | Customer | Company | Customer | | yes |
| 44 Customer | Customer | Company | Customer | Customer | yes |
| 45 Customer | Customer | Company | Customer | Customer | no |
| 46 Customer | Customer | Company | Company | Customer | no |
| 47 Customer | Customer | Company | Company | Customer | yes |
| 48 Customer | Customer | Company | Company | | yes | hardware or a combination of both. The control logic may be stored in an information storage medium, such as a computer-readable medium, e.g., a non-transient medium, as a plurality of instructions adapted to direct an information processing device to perform a set of steps or operations. Based on the disclosure and teachings provided herein, a person of ordinary skill in the art will appreciate other ways and/or methods to implement an equivalent.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other embodiments. It is to be understood that other variations and modifications of the embodiments described and illustrated herein are possible in light of the teachings herein and are to be considered as part of the spirit and scope of the present invention.

Embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Further, distributed, or networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the disclosure herein to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments, including what is described in the Abstract and the Summary, are not intended to be exhaustive or to limit the invention to the precise forms disclosed herein. While specific embodiments of, and examples for, the invention are described herein for teaching-by-illustration purposes only, various equivalent modifications are possible within the spirit and scope of the present invention, as those skilled in the relevant art will recognize and appreciate. As indicated, these modifications may be made in light of the foregoing description of illustrated embodiments and are to be included within the true spirit and scope of the invention.

Note that the preceding is a prophetic teaching and although only a few exemplary embodiments have been described in detail herein, those skilled in the art will readily appreciate that many modifications are possible in the exemplary embodiments without materially departing from the novel teachings and advantages herein. Please understand that features illustrated in the Figures are often interwoven rather than integral and sequential, as in sub-steps. Accordingly, all such modifications are intended to be included within the scope herein. Means-plus-function language is intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment fastening wooden parts, a nail and a screw may be equivalent structures.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed:

1. A machine configured to process chemically heated hot emitter generator data so as to produce output, the machine comprising:
   an analog detector arranged to produce intensity measurements of electromagnetic emissions of a chemically heated hot emitter which are less than or equal to full intensity of said emissions;
   an analog-to-digital converter arranged to receive and then convert the detected intensity measurements from an analog form to a digital form;
   a digital computer arranged to the receive the digital, detected intensity measurements and configured to transform the digital, detected intensity measurements to produce therefrom an output intermediate indicator of the chemically heated hot emitter electromagnetic emissions; and
   another digital computer which receives the output intermediate indicator of the chemically heated hot emitter electromagnetic emissions and processes the intermediate indicator and data into a billing record corresponding to an amount of the chemically heated hot emitter electromagnetic emissions; and
   an output device which outputs the billing record.

2. A machine configured to process chemically heated hot emitter generator data so as to produce output, the machine comprising:
   a computing system including a digital computer comprising memory storing executable instructions which when executed, enable the machine to perform the operations of:
   receiving digital data representing a chemically heated hot emitter generator of electromagnetic emissions and financial data which corresponds to the data representing the hot emitter generator, and then
   processing, using said data, in producing a financial term associated with at least one of a plurality of chemically heated hot emitter generators having conformity with said chemically heated hot emitter generator, and then producing, at an output device, output including the financial term associated with said at least one of a plurality of chemically heated hot emitter generators of electromagnetic emissions.

3. The machine of claim 2, wherein the computing system comprises:
an analog detector arranged to produce intensity measurements of chemically heated hot emitter electromagnetic emissions which are less than or equal to full intensity of said emissions;
an analog-to-digital converter arranged to receive and then convert the detected intensity measurements from an analog form to a digital form;
a digital computer arranged to the receive the digital, detected intensity measurements and configured to transform the digital, detected intensity measurements to produce therefrom an intermediate indicator of the chemically heated hot emitter electromagnetic emissions.

4. The machine of claim 2, wherein the digital data representing the chemically heated hot emitter generator of electromagnetic emissions comprises a hot emitter generator efficiency indicator, a hot emitter generator generating capacity indicator, or both.

5. The machine of claim 2, wherein the financial data comprises a rate of return for leasing a chemically heated hot emitter generator, a rate of return for selling a chemically heated hot emitter generator, or both.

6. The machine of claim 2, wherein the financial term comprises a chemically heated hot emitter generator lease rate.

7. The machine of claim 2, wherein the financial term comprises a chemically heated hot emitter generator sale price.

8. The machine of claim 2, wherein the financial term comprises a billing record based upon a chemically heated hot emitter generator lease rate and/or sale price.

9. The machine of claim 2, wherein the digital data representing the chemically heated hot emitter generator of electromagnetic emissions comprises both a chemically heated hot emitter generator usage record and a chemically heated hot emitter generator lease rate, and the output includes a billing record based upon the chemically heated hot emitter generator lease rate and the usage record.

10. A machine configured to process chemically heated hot emitter generator data so as to produce output, the machine comprising:
a computing system comprising a first digital computer, arranged to
receive an intermediate indicator of chemically heated hot emitter electromagnetic emissions output by a second digital computer, the intermediate indicator being a transformation of digitalized, by an analog-to-digital converter, intensity measurements detected from electromagnetic emissions of a chemically heated hot emitter and which are less than or equal to full intensity of said emissions, and then
process the intermediate indicator so as to produce, at an output device, a billing record corresponding to an amount of the chemically heated hot emitter electromagnetic emissions.

11. A machine configured to process chemically heated hot emitter generator data so as to produce output, the machine comprising:

a receiving computer, operably associated with an input device and an output device, which receives an intermediate indicator of chemically heated hot emitter electromagnetic emissions from a sending computer, the sending computer operably associated with a second input device and a second output device, wherein:
the sending computer is configured to carry out operations including:
receiving, at the second input device, digital, detected intensity measurements from an analog-to-digital converter which converts intensity measurements from an analog detector of chemically heated hot emitter electromagnetic emissions which are less than or equal to full intensity of said emissions; and then
transforming the detected intensity measurements in producing therefrom an intermediate indicator of the chemically heated hot emitter electromagnetic emissions; and then
outputting, at the second output device, the intermediate indicator of the chemically heated hot emitter electromagnetic emissions; and wherein
the receiving digital computer is configured to carry out other operations including:
receiving data comprising the intermediate indicator of the chemically heated hot emitter electromagnetic emissions that is output by the sending computer; and
processing, using the intermediate indicator of the chemically heated hot emitter electromagnetic emissions, so as to output a billing record corresponding to an amount of the chemically heated hot emitter electromagnetic emissions.

12. The machine of claim 11, wherein the receiving computer is further configured to:
communicate with at least one other sending computer, each said at least one other sending computer operably associated with a respective input device and a respective output device, and configured to carry out operations including:
receiving, at said respective input device, respective digital, detected intensity measurements from a respective analog-to-digital converter which converts respective detected intensity measurements from respective chemically heated hot emitter electromagnetic emissions which are less than or equal to full intensity of said emissions; and then
transforming the respective detected intensity measurements to produce therefrom a respective intermediate indicator of the respective chemically heated hot emitter electromagnetic emissions; and then
outputting the respective intermediate indicator of the chemically heated hot emitter electromagnetic emissions to the receiving computer, which then processes the respective intermediate indicator of the respective chemically heated hot emitter electromagnetic emissions so as to produce, at the output device of the first digital computer, a respective billing record corresponding to a respective amount of the respective chemically heated hot emitter electromagnetic emissions.

13. The machine of claim 1, wherein one or more computers are configured to carry out the operations of:
receiving an indication of an electric power load demand;
computing, from said load demand, at least one operating parameter for a chemically heated hot emitter to change intensity of said emissions, such that electric power generated from said emissions meets at least some of the said demand; and producing output comprising at least one control instruction to configure operation of the chemically heated hot emitter with said at least one operating parameter.

14. The machine of claim 13, wherein each said sending computer is configured to carry out the operations of:

sending a communication to at least one said sending computer, responsive to a detected indication of electrical power load demand exceeding electrical power being generated from the electromagnetic emissions of the chemically heated hot emitter associated with the sending computer that is sending the communication, said communication comprising an indication of unmet electrical power load demand; and computing, by each said sending computer that receives the communication, from said unmet electrical load demand, at least one operating parameter for the chemically heated hot emitter associated therewith to change a corresponding intensity of emissions, such that electric power generated from said emissions of the chemically heated hot emitter associated therewith meets some or all of the unmet electrical load demand; and producing, by each said sending computer that receives the communication, output comprising at least one control instruction to configure the associated respective chemically heated hot emitter with said at least one operating parameter; wherein the electrical outputs of the generators generating electrical power from the respective emissions of the respective chemically heated hot emitters associated with said sending computers being connected to a common electrical grid.

15. The machine of claim 10, wherein one or more computers are configured to carry out the operations of:
receiving an indication of an electric power load demand;
computing, from said load demand, at least one operating parameter for a chemically heated hot emitter to change intensity of said emissions, such that electric power generated from said emissions meets at least some of the said demand; and
producing output comprising at least one control instruction to configure operation of the chemically heated hot emitter with said at least one operating parameter.

16. The machine of claim 11, wherein one or more computers are configured to carry out the operations of:
receiving an indication of an electric power load demand;
computing, from said load demand, at least one operating parameter for a chemically heated hot emitter to change intensity of said emissions, such that electric power generated from said emissions meets at least some of the said demand; and
producing output comprising at least one control instruction to configure operation of the chemically heated hot emitter with said at least one operating parameter.

17. The machine of claim 12, wherein one or more computers are configured to carry out the operations of:
receiving an indication of an electric power load demand;
computing, from said load demand, at least one operating parameter for a chemically heated hot emitter to change intensity of said emissions, such that electric power generated from said emissions meets at least some of the said demand; and
producing output comprising at least one control instruction to configure operation of the chemically heated hot emitter with said at least one operating parameter.

* * * * *